UNITED STATES PATENT OFFICE.

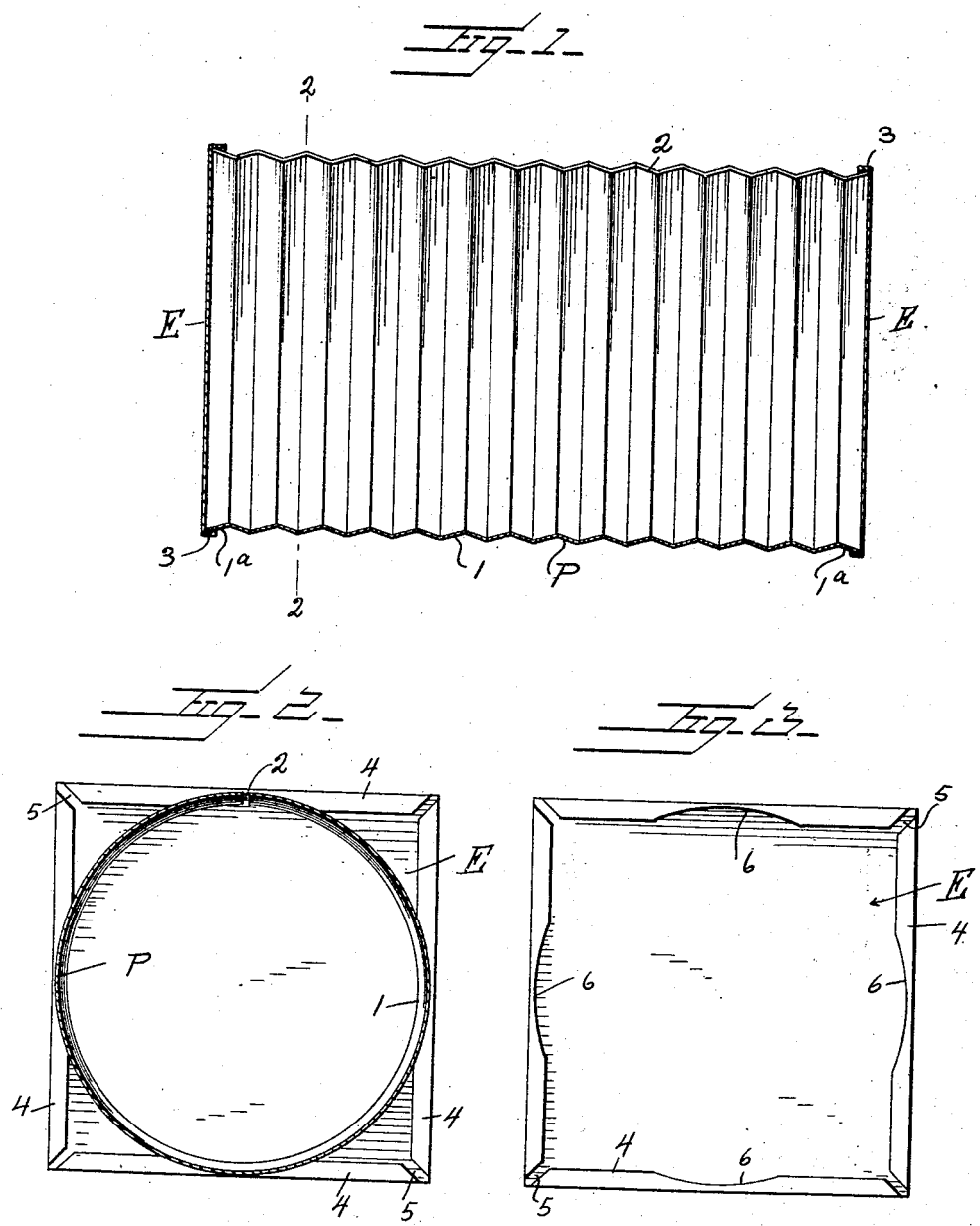

SAMUEL ROY CASTILE, OF ABERDEEN, WASHINGTON.

BAKE-PAN.

1,309,062.

Specification of Letters Patent.   Patented July 8, 1919.

Application filed October 16, 1918.   Serial No. 258,368.

*To all whom it may concern:*

Be it known that I, SAMUEL R. CASTILE, a citizen of the United States, residing at Aberdeen, in the county of Grays Harbor and State of Washington, have invented certain new and useful Improvements in Bake-Pans, of which the following is a specification, reference being had to the accompanying drawings.

This invention relates to certain improvements in bake pans, and it is an object of the invention to provide a device of this general character especially designed and adapted for use in the baking of bread, and it is the object of the invention to provide a pan of this general character which substantially and entirely incloses the dough whereby the moisture is retained during the baking operation to such an extent that a sweeter and better loaf is obtained than when the dough is baked within a pan of the type now generally employed.

It is also an object of the invention to provide a novel and improved pan which, when in assembled relation is substantially cylindrical in form, and whereby heat is permitted to strike quickly to the heart of the loaf and thereby rendering the baking of substitute flours more satisfactory, and whereby the resultant corrugations formed in the baked loaf assist in slicing the loaf uniformly, resulting in economy in bread cutting.

An additional object of the invention is to provide a novel and improved bake pan which is highly sanitary, and which is constructed in a manner to permit the same to be readily and conveniently cleansed.

The invention consists in the details of construction and in the combination and arrangement of the several parts of my improved bake pan whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a longitudinal vertical sectional view taken through an assembled bake pan constructed in accordance with an embodiment of my invention;

Fig. 2 is a view in end elevation of my improved pan as herein disclosed with one of the end plates removed; and Fig. 3 is a view in elevation of the inner face of one of the end plates as herein employed.

As disclosed in the accompanying drawings, P denotes a plate of flexible sheet metal or equivalent material which is provided throughout its length with a series of corrugations 1, and which corrugations are so formed as to afford the end flanges 1ª. The plate P, when in assembled relation, is adapted to be rolled in a direction longitudinally of the corrugations 1 to produce a substantially cylindrical body as particularly illustrated in Fig. 2 with a slit or slot 2 extending longitudinally thereof throughout its entire length, and whereby said body is capable of sufficient expansion to permit the desired connection therewith of the end plates E. Each of the end plates E is substantially square and the marginal portions thereof are provided with the inwardly directed flanges 3 having their outer marginal portions defined by the inwardly directed flanges 4. The flanges 3 are each of a length less than the adjacent marginal portion of the plate E, so that the spaces 6 are provided between adjacent ends of the flanges 4 in order to facilitate the effective cleansing of the end plate E when detached, so that the several parts of my improved bake pan may be maintained in a highly sanitary condition. It will also be self evident that when the plate P is in an unapplied position, it may also be thoroughly cleansed as the occasions of practice may require.

The central portion of each of the flanges 4 is provided with a recess 7 having its edge disposed on a curvature substantially concentric of the periphery of an end portion of the plate P when assembled, and into which a portion of said curved plate seats. An end flange 1ª of the plate P underlies the marginal portion of each of said recesses 7, and the inherent resiliency possessed by the rolled plate P will serve to effectually maintain the end plates E in applied position, and also to maintain the plate P in its substantially cylindrical form.

In practice a quantity of dough sufficient to substantially fill one-half of the assembled pan is laid on the hand of the operator and allowed to run out on the wrist. The hand with the dough is then inserted within the pan, it being understood that one of the end plates E has not been applied, and the hand turned over and the dough disposed within the pan. The second end plate is then applied and the pan positioned within the oven with the slit or slot 2 upwardly directed. It will be self evident that the pan may be readily maintained in this position as the marginal portions of the end plates E remote from the slit or slot 2 serve to effectually maintain the pan in this desired position. In other words, it is to be stated that in addition to closing the ends of the pan, the plates E also serve as supports therefor.

It has been found in practice that the corrugations E permit the heat to strike more quickly the center of the dough, and which is of particular advantage with substitute flour, as is now required by the present war conditions, is used. The corrugations 2 also result in a marking on the periphery of the loaf which serves as a guide to assure a more even or uniform slicing of the loaf.

From the foregoing description, it is thought to be obvious that a bake pan constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A bake pan comprising a flexible plate adapted to be rolled into substantially a cylindrical form, said plate possessing inherent resiliency, and end plates engaging the opposite end portions of the rolled plate, said end plates being maintained in applied position by the inherent resiliency of the plate.

2. A bake pan comprising a flexible plate adapted to be rolled into substantially a cylindrical form, said plate possessing inherent resiliency, and end plates engaging the opposite end portions of the rolled plate, said end plates being maintained in applied position by the inherent resiliency of the plate, said plate being corrugated, said corrugations extending circumferentially of the plate when in its substantially cylindrical form.

3. A bake pan comprising a flexible plate possessing inherent resiliency and adapted to be rolled into substantially cylindrical form, the ends of said plate being provided with flanges, plates closing the end of the cylinder formed by the plate, each of said plates being provided with inwardly directed flanges which the flanges of the plate underlie.

In testimony whereof I hereunto affix my signature in the presence of two witnesses.

SAMUEL ROY CASTILE.

Witnesses:
W. F. MOODY,
SAM OLIVER.

Copies of this patent may be obtained for five cents each, by addressing the "Commissioner of Patents, Washington, D. C."